(No Model.)
W. BROWN.
BONDING DEVICE FOR ELECTRIC RAILWAYS.
No. 553,099. Patented Jan. 14, 1896.
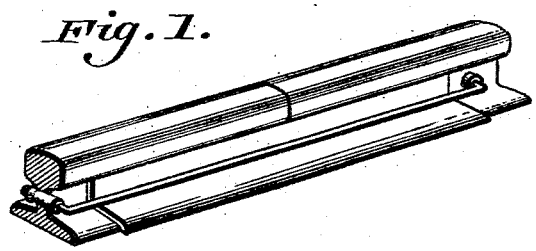
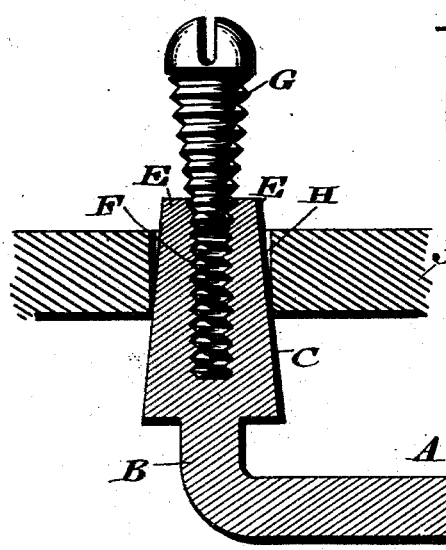
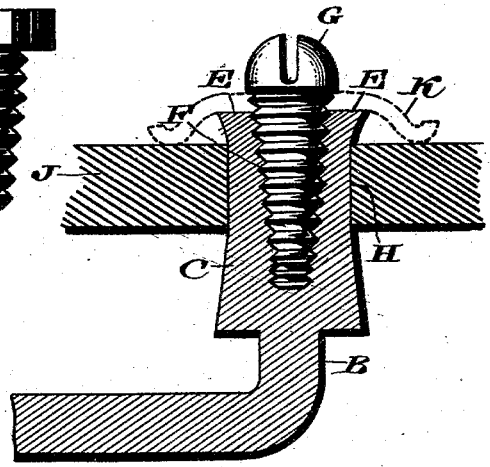
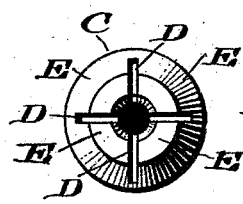
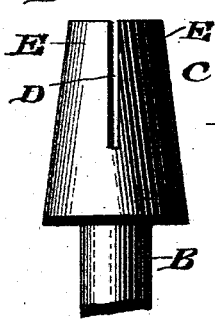
Witnesses
P. H. Angle.
L. Douville.
Inventor
Wilson Brown
By John A. Wiedersheim
Attorney

UNITED STATES PATENT OFFICE.

WILSON BROWN, OF CAMDEN, NEW JERSEY.

BONDING DEVICE FOR ELECTRIC RAILWAYS.

SPECIFICATION forming part of Letters Patent No. 553,099, dated January 14, 1896.

Application filed May 25, 1895. Serial No. 550,588. (No model.)

*To all whom it may concern:*

Be it known that I, WILSON BROWN, a citizen of the United States, residing in the city and county of Camden, State of New Jersey, have invented a new and useful Improvement in Bonding Devices for Electric Railways and other Electrical Conductors, which improvement is fully set forth in the following specification and accompanying drawings.

My invention consists of a bond for electric conductors of novel construction, whereby the same may be firmly secured in position.

Figure 1 represents a perspective view of a bond or connector embodying my invention. Figs. 2 and 3 represent sections of opposite limbs of the same on an enlarged scale and showing a bond having its ends respectively loose and in fixed position. Fig. 4 represents an end view of one of the limbs of the bond. Fig. 5 represents a side elevation thereof.

Similar letters of reference indicate corresponding parts in the several figures.

Referring to the drawings, A designates the body of a bond or connector formed of a piece of copper or other suitable metal, and having limbs B B on the ends thereof, terminating in heads C C, which are exteriorly of conical shape, and longitudinally divided, as at D, forming the jaws E, said heads having within the same the screw-threaded openings F, which are adapted to receive the conical screws G.

The heads are placed in openings H of the rail J, and the screw G inserted and properly rotated, whereby the jaws E are expanded and wedged against the walls of the openings H, the outer ends of said jaws being caused to flare, as shown in Fig. 3, whereby the heads are most firmly held in position in the rail, it being evident that the heads may be further tightened when desired by the proper operation of the screw.

Should it be desired to remove the bond, the screws are withdrawn, whereby the jaws contract so that they may be withdrawn through the openings H of the rail, as shown in Fig. 2, it being evident that the heads and body remain intact, and the bond may be reused as desired.

If desired, the screws may be substituted by conical pins, in which case the threads within the heads may be dispensed with.

In order to prevent the admission of water or moisture into the head of the bond and the consequent rusting or corrosion of the same, I may employ the cap K, which is of concave or other suitable dishing form, the same having an opening to receive the screw G and being located behind the head of the same and resting on the rail or conductor J, as a sheath for said head, so as to cover the opening and slots therein, the material of the washer being such as to permit the ready expansion and contraction of the same.

Having thus described my invention, what I claim as new, and desire to secure by Letters Patent, is—

1. A bond terminal having a screw threaded opening, lengthwise slotted, and means to enter and expand said opening, substantially as described.

2. In a bond for an electrical conductor, an internally screw-threaded head which is adapted to enter an opening in the conductor, and is formed with expansible jaws, and a screw adapted to enter said head and expand said jaws, substantially as described.

3. A bond having a head on the limb thereof, and longitudinal divisions in said head forming jaws thereon, and a conical screw adapted to enter a threaded opening in said head and expand said jaws, substantially as described.

4. A bond for an electric conductor, formed of a body with internally screw-threaded heads on the limbs thereof, and conical screws entering said heads, which latter are formed with jaws which are adapted to be actuated by said screws, substantially as described.

5. A bond for an electric conductor consisting of a body with limbs on its ends, internally screw-threaded divided heads on said limbs forming jaws, and screws for expanding said jaws, said jaws having openings in their inner faces and said screws entering said openings, the parts named being combined substantially as described.

6. A bond for an electrical conductor having a divided head forming expansible jaws, and a cap adapted to rest on the conductor and having an opening for an expanding device of said jaws, said parts being combined substantially as described.

WILSON BROWN.

Witnesses:
JOHN A. WIEDERSHEIM,
WM. C. WIEDERSHEIM.